US012783291B2

(12) United States Patent
Houatra

(10) Patent No.: US 12,783,291 B2
(45) Date of Patent: Nov. 3, 2026

(54) METHOD FOR SUPERVISING AND SUPERVISOR OF THE CONTROL OF A DISTRIBUTED PARALLEL PROCESSING OPERATION IN A COMMUNICATION NETWORK, SERVICE PROVISION DEVICE AND PROGRAM IMPLEMENTING SAME

(71) Applicant: ORANGE, Issy-les-Moulineaux (FR)

(72) Inventor: Drissa Houatra, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 377 days.

(21) Appl. No.: 18/696,574

(22) PCT Filed: Sep. 29, 2022

(86) PCT No.: PCT/FR2022/051840
§ 371 (c)(1),
(2) Date: Mar. 28, 2024

(87) PCT Pub. No.: WO2023/052730
PCT Pub. Date: Apr. 6, 2023

(65) Prior Publication Data

US 2025/0036457 A1 Jan. 30, 2025

(30) Foreign Application Priority Data

Sep. 30, 2021 (FR) ....................................... 2110333

(51) Int. Cl.
*G06F 3/00* (2006.01)
*G06F 9/38* (2018.01)
*G06F 9/48* (2006.01)

(52) U.S. Cl.
CPC ............ *G06F 9/485* (2013.01); *G06F 9/3885* (2013.01)

(58) Field of Classification Search
CPC ........................................................ G06F 9/48
See application file for complete search history.

(56) References Cited

U.S. PATENT DOCUMENTS

2006/0048142 A1* 3/2006 Roese ................. H04L 41/0894 717/176
2007/0299975 A1* 12/2007 Daschakowsky ..... G06F 16/214 709/228

(Continued)

OTHER PUBLICATIONS

Michael Adler, Triggered Instructions: A Control Paradigm for Spatially-Programmed Architectures. (Year: 2013).*

(Continued)

*Primary Examiner* — Lechi Truong
(74) *Attorney, Agent, or Firm* — David D. Brush; Westman, Champlin & Koehler, P.A.

(57) ABSTRACT

A method for supervising control of a parallel processing operation distributed in a communication network. The distributed parallel processing operation includes a control method implemented by a service provision device and multiple processing components, including first and second components distributed over nodes of the network. The control method includes a series of steps including triggering execution of a processing component by a node. The control supervision method includes triggering the execution of a processing component as soon as the control method has reached the step of triggering the execution of this component.

7 Claims, 5 Drawing Sheets

(56) References Cited

U.S. PATENT DOCUMENTS

| | | | | |
|---|---|---|---|---|
| 2014/0281323 | A1* | 9/2014 | Duluk, Jr. | G06F 12/1009 711/165 |
| 2016/0182614 | A1* | 6/2016 | Udupi | G06F 9/46 709/217 |
| 2019/0361813 | A1* | 11/2019 | Zbiciak | G06F 12/0897 |
| 2020/0034311 | A1* | 1/2020 | Wang | H04L 9/0637 |
| 2022/0058476 | A1* | 2/2022 | Calidas | G06T 1/20 |

OTHER PUBLICATIONS

International Search Report dated Dec. 12, 2022 for corresponding International Application No. PCT/FR2022/051840, filed Sep. 29, 2022.

Written Opinion of the International Searching Authority dated Dec. 12, 2022 for corresponding International Application No. PCT/FR2022/051840, filed Sep. 29, 2022.

Li T. et al., "Low-latency speculative inference on distributed multi-modal data streams", Proceedings of the 19th Annual International Conference on Mobile Systems, Applications, and Services, ACMPUB27, New York, NY, USA, Jun. 24, 2021 (Jun. 24, 2021), p. 67-80, XP058536137.

Gabbay, F. et al., "Using value prediction to increase the power of speculative execution hardware", ACM Transactions on Computer Systems (TOCS), Association for Computing Machinery, Inc, US, vol {0} 16, No. {0} 3, Aug. 1, 1998 (Aug. 1, 1998), p. 234-270, XP058222522.

English translation of the Written Opinion of the International Searching Authority dated Dec. 12, 2022 for corresponding International Application No. PCT/FR2022/051840, filed Sep. 29, 2022.

Pilla, M. L. et al., "A Speculative Trace Reuse Architecture with Reduced Hardware Requirements," Computer Architecture and High Performance Computing, 2006. SBAC-PAD & APOS;06. 18th International Symposium on, IEEE, PI, Oct. 1, 2006 (Oct. 1, 2006), p. 47-54, XP031031897.

European Notification Under Article 94(3) EPC dated Jun. 5, 2026 for corresponding European Application No. 22 793446.0.

Baudisch Daniel et al., "Evaluation of Speculation in Out-of-Order Execution of Synchronous Dataflow Networks," International Journal of Parallel Programming. Plenum Press, New York., US, vol. 43, No. 1, Oct. 22, 2013 (Oct. 22, 2013), pp. 86-129, XP035428603.

* cited by examiner

[Fig 1a]
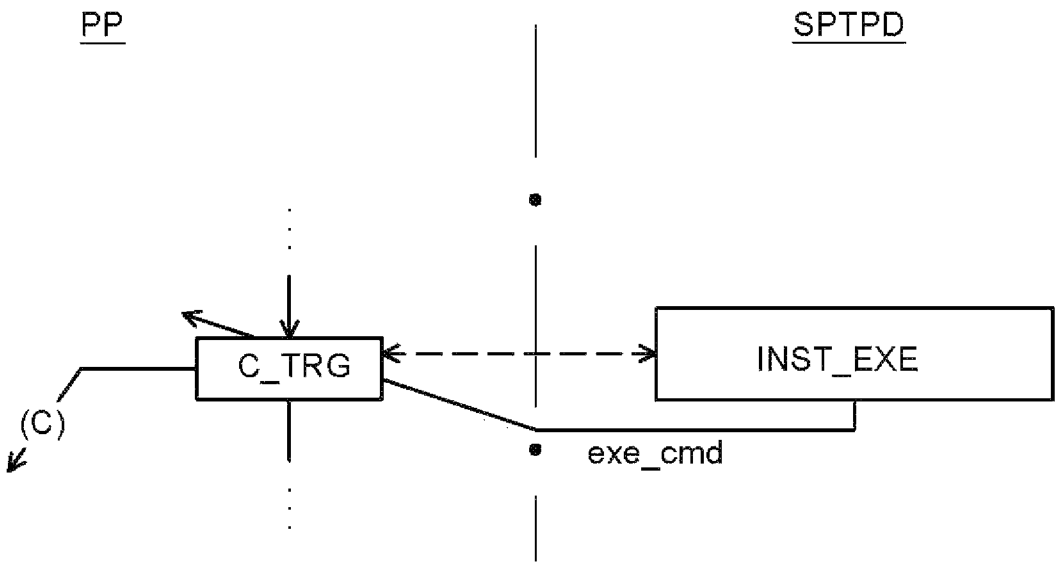
[Fig 1b]
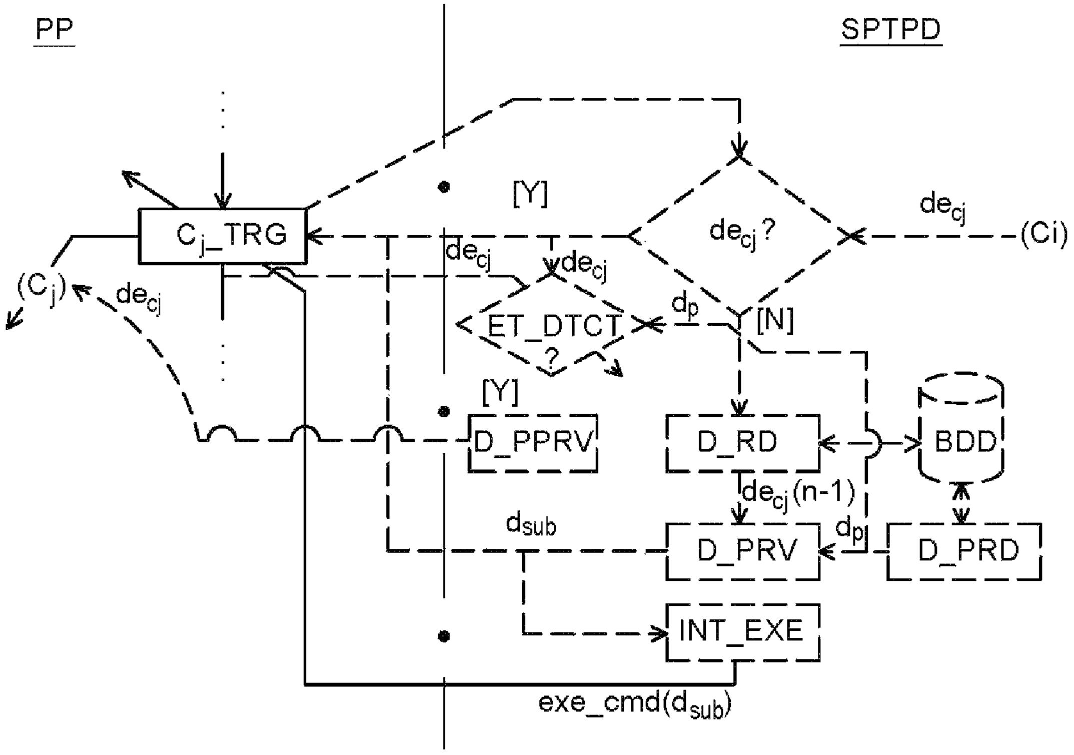

[Fig 1c]
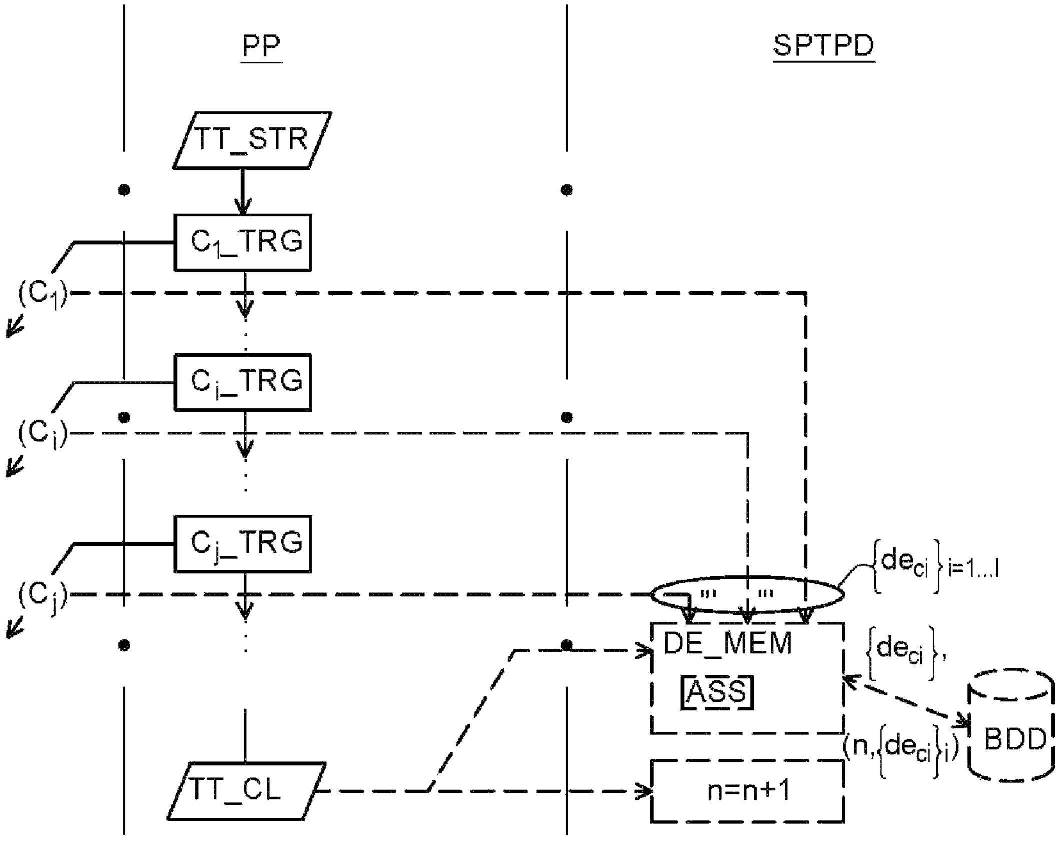
[Fig 1d]
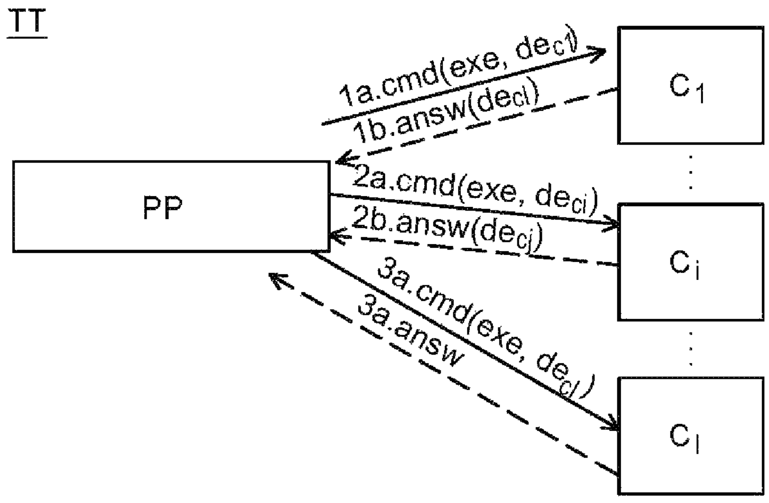

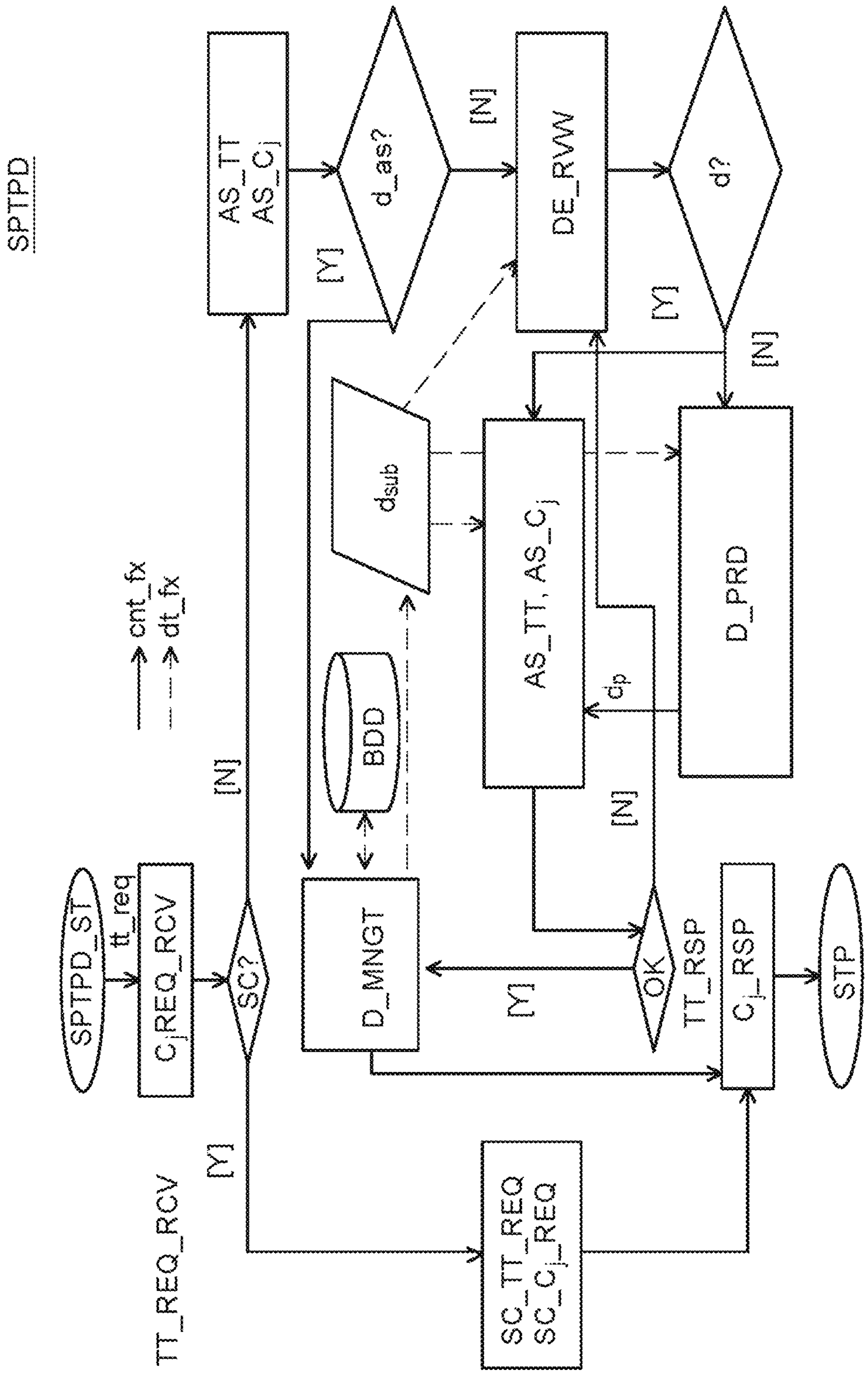
[Fig. 2]

[Fig 3]
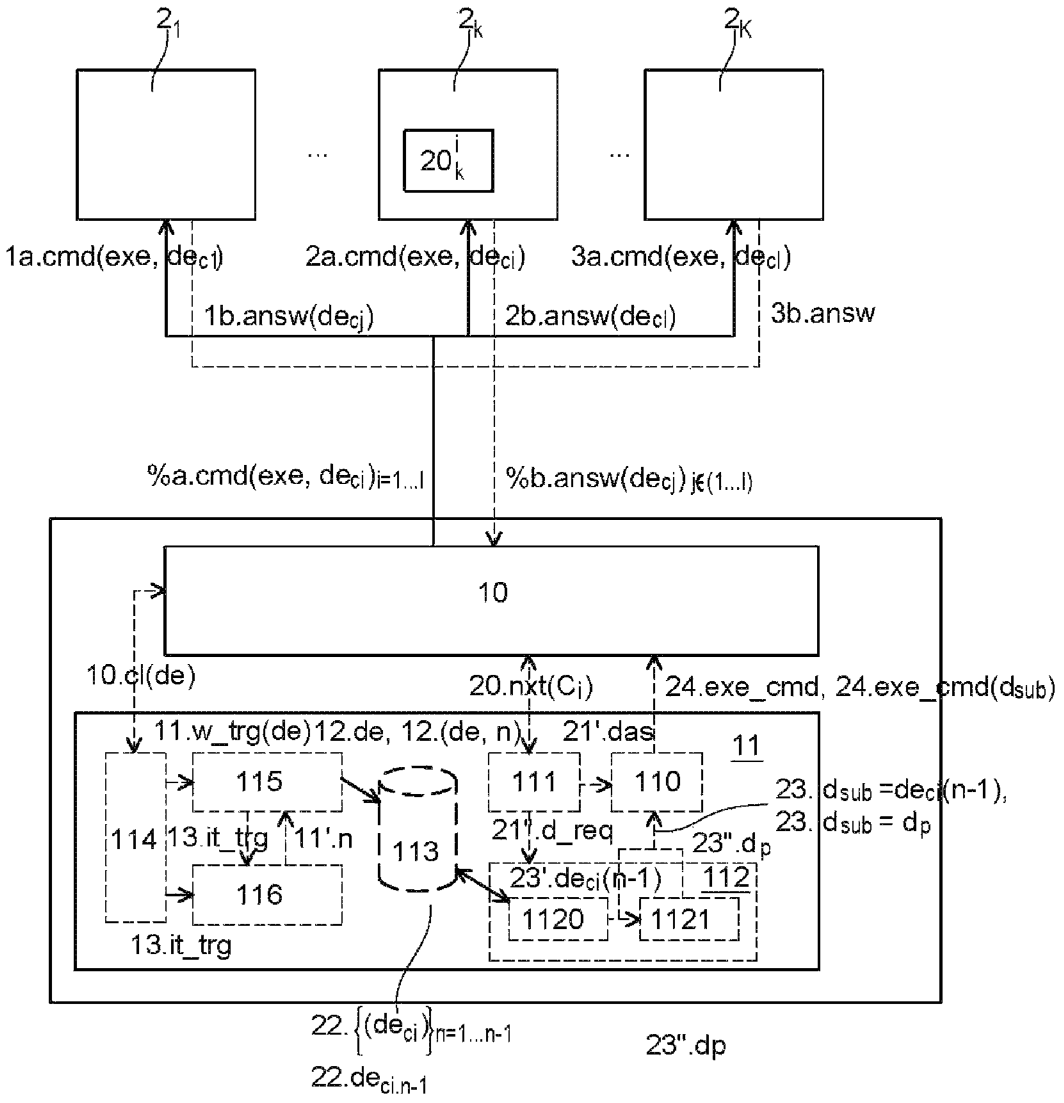

[Fig 4]
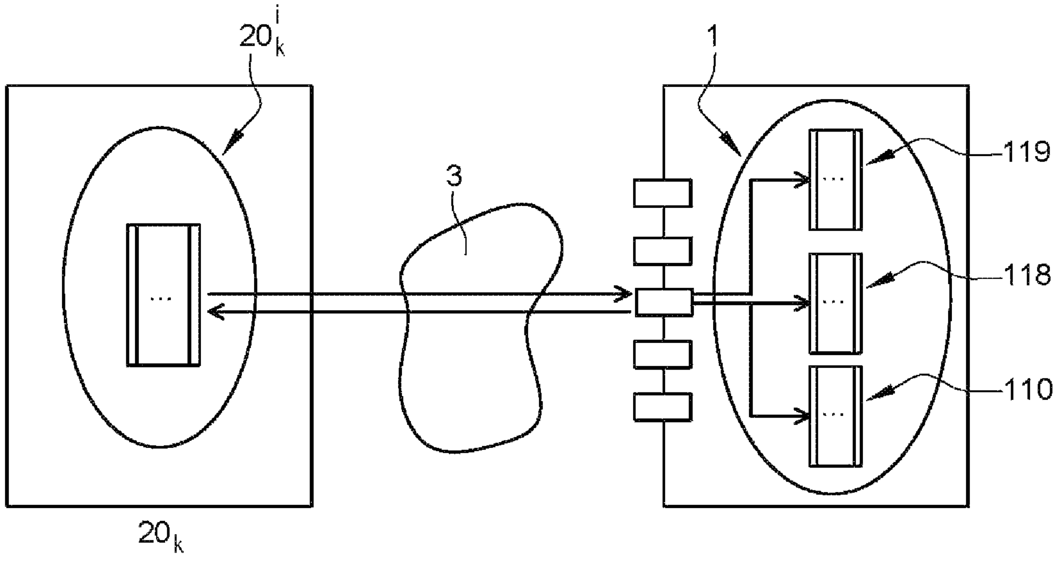
[Fig 5]
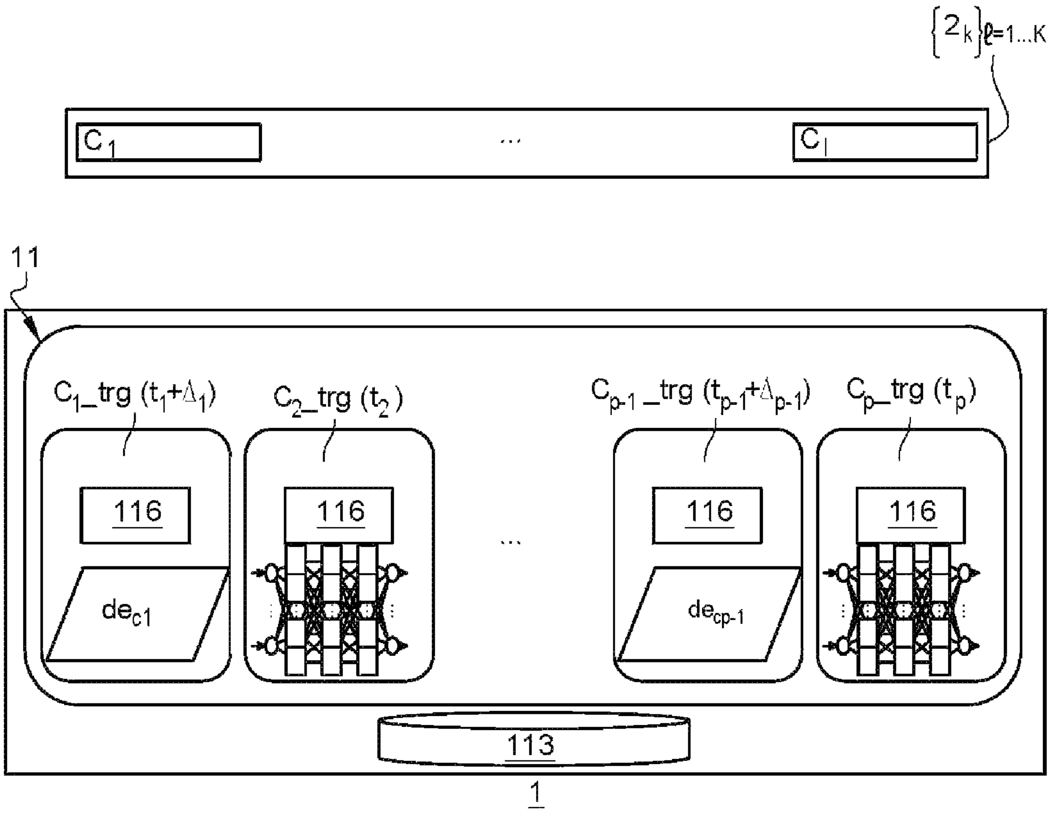

METHOD FOR SUPERVISING AND SUPERVISOR OF THE CONTROL OF A DISTRIBUTED PARALLEL PROCESSING OPERATION IN A COMMUNICATION NETWORK, SERVICE PROVISION DEVICE AND PROGRAM IMPLEMENTING SAME

CROSS-REFERENCE TO RELATED APPLICATIONS

This Application is a Section 371 National Stage Application of International Application No. PCT/FR2022/051840, filed Sep. 29, 2022, and published as WO 2023/052730 A1 on Apr. 6, 2023, not in English, which claims priority to French Patent Application No. 2110333, filed Sep. 30, 2021, the contents of which are hereby incorporated by references in their entireties.

TECHNICAL FIELD

The invention relates to parallel processing operations distributed in a communications network and, more particularly, the control of these distributed parallel processing operations.

PRIOR ART

Distributed parallel processing operations are notably used for "cloud computing" or the execution of programs in the network, for example of distributed "cloud" services, and learning applications in artificial intelligence (automatic learning, statistical learning, machine learning, learning by following).

In this field, generally speaking, the programmer starts by applying basic design techniques for distributed programs (called parallel programs), consisting of control and data models, decompositions and partitions, placements, exchanges and synchronizations, etc. Next, the algorithms are designed and optimizations are carried out on a case by case basis, with the objective of reducing the processing times as far as possible. The results depend in large part on the field of application, and also on a certain know-how as regards engineering of parallel programs or simultaneous engineering. However, in the majority of cases, the resulting algorithms and programs lead to limited gains in performance, and above all which are greatly degraded with the increase in the number of processing units. Only the applications referred to as embarrassingly parallel, with little coordination between the parallel entities, avoid this difficulty. However, the vast majority of the applications in the field of data analysis and of learning are far from being embarrassingly parallel. The training of a deep learning model for example is absolutely not embarrassingly parallel.

The programming known as "Dataflow" is a model which calls into question the principle of synchronous control (instruction by instruction) of a program. It is distinguished by its particular way of managing the control flow of the parallel programs. Being recently applied to platforms for real-time processing of massive data sets, it allows losses of control time to be avoided, but not the exchange times nor the wait times for the data. Therefore, it does in fact allow a (limited) part of the coordination delays to be avoided. Furthermore, the design and implementation of "Dataflow" programs prove to be difficult to control, which limits the adoption of the "Dataflow" models.

The prior art techniques allow the programs to be accelerated by distributed parallel processing operations with limited success, but all these techniques remain based on the control of the processing operations by the availability of the input data. They always run up against greatly increasing coordination delays whenever a large number of machines and of processing units are used. In the case of massively parallel processing, it often happens that, beyond a certain limit, the addition of processing units becomes counter-productive.

DESCRIPTION OF THE INVENTION

One of the aims of the present invention is to overcome the drawbacks of the prior art.

One subject of the invention is a method for supervising the control of a distributed parallel processing operation in a communications network, the distributed parallel processing operation being composed of a control method implemented by a service provision device and of several components of the processing operation, including a first component and second component, distributed over nodes of the communications network, the control method comprising a succession of steps including a step for triggering execution of a component of the processing operation by a node, the control supervision method comprising an execution of the step for triggering execution of a component of the processing operation as soon as the control method has reached the step for triggering the execution of this component.

Thus, the present invention differs from the prior art techniques by completely breaking away from the constraint on availability of the input data prior to the execution of a component of the processing operation. This invention allows the execution of the remote component of the processing operation (service, program, method, procedure, function, etc.) to be launched prior to the availability of the values of the input parameters (also referred to as input data). The invention relates to any processing operation that may be remotely called up according to imperative or declarative programming, with input data.

The programs implementing this invention allow the coordination delays of the distributed parallel processing operations to be even more limited, beyond what can be done up to now. In the case of distributed services requiring significant wait times for the input data, the implementation of this invention allows distributed software applications to be drastically accelerated, by limiting the part of the coordination delays due to the wait times for the data at the input of the processing operations. This is often the case for the massively parallel services whose programs and processing are not embarrassingly parallel, a category which encompasses many future services, notably in distributed learning in AI.

Advantageously, the control supervision device comprises the provision of substitution data to the control method if, when the control method has reached a step for triggering execution of a second component of the processing operation, input data supplied by a first component of the processing operation and necessary for the launch of the execution of the second component of the processing operation are not available.

Thus, the control of the processing operation is not modified since the control receives data that it considers as being input data, even if the latter are not available, allowing the control of the execution of the corresponding processing component to be triggered either without input data or using the substitution data. The control is then said to be asynchronous since it commands the execution of a component of the processing operation without supplying the input data ad hoc.

Advantageously, the supervision method comprises a reading of input data of a preceding execution of the second component, the input data of the preceding execution constituting the substitution data.

Thus, the processing component is executed using substitution data which are probably equivalent to the expected input data, where equivalent means that the result of the processing operation will be identical or come close to that produced with the expected input data while at the same time reducing the delay for supplying the result.

Advantageously, the supervision method comprises a prediction of input data, the predicted input data constituting the substitution data.

Thus, the risk of a processing error is further reduced while at the same time conserving the reduction in delay.

Advantageously, the supervision method comprises, during the closure of the processing operation, a recording of the input data of the components of the processing operation being executed.

Thus, the substitution data may be based at least on the input data of the preceding execution of the processing operation limiting the risks of processing errors.

Advantageously, the supervision method iterates, during the closure of the processing operation, an invocation counter reset to zero.

Advantageously, the supervision method comprises an association of the invocation counter with the recorded data.

Thus, the substitution data may furthermore be based on the data from the preceding executions of the processing operation but also on their trends further reducing the risks of processing errors.

Advantageously, the prediction is a function of at least one of the data sets from amongst the following of the recorded input data and of the associated invocation counter.

Advantageously, the supervision method comprises, if the supervision method receives data from a first component intended for a second component after the execution of the step for triggering execution of the second component, a supply of the data coming from the first component to the second component if a prediction error is detected depending on the predicted input data and on the received input data.

Thus, the processing errors are limited because the prediction drift is pre-empted.

Advantageously, according to one embodiment of the invention, the various steps of the method according to the invention are implemented by a software application or computer program, this application comprising software instructions designed to be executed by a data processor of a supervisor controlling a processing operation notably forming part of a service provision device and being designed to command the execution of the various steps of this method.

The invention is therefore also aimed at a program comprising program code instructions for the execution of the steps of the method for supervising the control of a processing operation when said program is executed by a processor.

This program may use any given programming language and take the form of source code, object code or code intermediate between source code and object code, such as in a partially compiled form or in any other desired form.

One subject of the invention is also a supervisor of the control of a distributed parallel processing operation in a communications network, the distributed parallel processing operation being composed of a control method implemented by a controller of a service provision device comprising the supervisor and of several components of the processing operation, including a first component and second component, distributed over nodes of the communications network, the control method comprising a succession of steps including a step for triggering execution of a component of the processing operation by a node, the supervisor comprising a decoupler 110 designed to command the execution of the step for triggering execution of a component of the processing operation as soon as the control method has reached the step for triggering the execution of this component.

Advantageously, the supervisor comprises a memory designed to store data, during the closure of the processing operation, input data of the components of the processing operation being executed. Advantageously, the supervisor comprises an invocation counter reset to zero and designed to be iterated during the closure of the processing operation.

One subject of the invention is also a service provision device comprising a controller designed to control a distributed parallel processing operation in a communications network, the distributed parallel processing operation being composed of a control method implemented by the controller and of several components of the processing operation, including a first component and second component, distributed over nodes of the communications network, the control method comprising a succession of steps including a step for triggering execution of a component of the processing operation by a node, the service provision device comprising a supervisor designed to command the execution of the step for triggering execution of a component of the processing operation as soon as the control method has reached the step for triggering the execution of this component.

BRIEF DESCRIPTION OF THE DRAWINGS

The features and advantages of the invention will become more clearly apparent by reading the description, presented by way of example, and from the related figures which show:

FIG. 1*a*, a simplified diagram of a method for supervising the control of a distributed parallel processing operation according to the invention, FIG. 1*b*, a non-exhaustive detailed diagram of a first part of a method for supervising the control of a distributed parallel processing operation according to the invention, FIG. 1*c*, a simplified diagram of a second part of a method for supervising the control of a distributed parallel processing operation according to the invention, FIG. 1*d*, a simplified diagram of a distributed parallel processing operation, FIG. 2, a simplified diagram of a flow chart illustrating the supervision method according to the invention, FIG. 3, a simplified diagram of a distributed communications architecture comprising a supervisor according to the invention, FIG. 4, a simplified diagram of a communications architecture in which a component of a processing operation is implemented in a remote node of a service provision device controlling the processing operation according to the invention, FIG. 5, a simplified diagram of a communications architecture comprising a service provision device supervising individually the control of the execution by remote nodes of a component of a processing operation and the ad hoc prediction of the input data for the components.

DESCRIPTION OF THE EMBODIMENTS

The invention is motivated by the needs for design of the future networks and services (5G, 5G+, etc.) with edge-computing techniques and distributed cloud-edge services. It opens up the way to novel uses of learning, to design and programming of higher performance distributed cloud-edge services for the future networks and services, and to an implementation of higher performance distributed processing operations for the training of the distributed learning models in AI. It makes use of the resources aggregated and distributed within edge network installations of an operator (access, aggregation, mobile core, etc.) as support to the execution of cloud services, in order to face up to the processing load with a higher performance and thus to reduce the processing time. This type of approach to the learning is growing, and its generalized use in the future networks is becoming clear. In practice, the gains in time due to the distributed processing operations often turn out to be very limited whenever a large number of processing units (CPU/GPU cores, etc.) are used. This problem of effective gain in performance when scaling up is due to a significant increase in the coordination delays between the processing units, which delays generally increase with the number of machines and network exchanges.

FIG. 1 illustrate the supervision method according to the invention.

FIG. 1*a* illustrates a simplified diagram of a method for supervising the control of a distributed parallel processing operation according to the invention.

The supervision method SPTPD supervises the control PP of a distributed parallel processing operation in a communications network. The distributed parallel processing operation is composed of a control method PP implemented by a service provision device and of several components C of the processing operation, including a first component and second component, distributed over nodes of the communications network. The control method PP comprises a succession of steps including a step for triggering C_TRG execution of a component of the processing operation by a node. The method SPTPD for supervising the control comprises an execution INST_EXE of the step for triggering execution of a component of the processing operation as soon as the control method PP has reached the step for triggering the execution of this component.

FIG. 1*b* illustrates a detailed non-exhaustive diagram of a first part of a method for supervising the control of a distributed parallel processing operation according to the invention.

In particular, if, when the control method PP reaches a step for triggering execution of a second component Cj of the processing operation, input data $dec_i$ supplied by a first component Ci of the processing operation and necessary for the launch of the execution of the second component C2 of the processing operation are not available $dec_i$?=[N], the control supervision device SPTPD comprises a supply D_PRV of substitution data $d_{sub}$ to the control method PP.

In particular, the supervision method SPTPD comprises a verification of the availability of the input data $dec_i$ ?. The verification of the availability of the input data of a component Cj is verified as soon as the control method has reached the step for triggering the execution of this component Cj.

In particular, when the input data $dec_i$ of the second processing component Cj are available $dec_i$ ?=[Y] and when the control method PP reaches the step for triggering Cj_TRG the execution of the second component Cj, then the supervision method directly supplies these input data $dec_i$ to the control method which triggers Cj_TRG the execution of the second component Cj while transmitting the available input data $dec_i$ to the component Cj.

In particular, the supervision method SPTPD detects when the control method reaches a step for triggering Cj_TRG an execution of a component of the processing operation. Alternatively, the control method PP informs the supervision method SPTPD that a step for triggering Cj_TRG an execution of a component of the processing operation has been reached.

In particular, the supervision method SPTPD detects the input data $dec_i$ expected by the processing component Cj whose control method PP has reached the execution triggering step Cj_TRG. Alternatively, the control method PP requests from the supervision method SPTPD the input data $dec_i$ expected by the processing component Cj whose control method PP has reached the execution triggering step Cj_TRG.

In particular, the supervision method SPTPD comprises a receipt of data supplied by the execution of a first component Ci of the processing operation, notably the input data for a second component of the processing operation Cj.

In particular, the supervision method SPTPD comprises a reading D_RD of input data from a preceding execution of the second component $dec_j(n-1)$, the input data from the preceding execution forming the substitution data: $d_{sub}=dec_j(n-1)$. Notably, the provision of input data D_PRV then supplies the previous data $dec_j(n-1)$ as substitution data $d_{sub}$.

In particular, when the input data of the second component are not available $dec_i$?=[N] and when the control method PP reaches the step for triggering Cj_TRG the execution of the second component Cj, the supervision method SPTPD reads D_RD the input data from the preceding execution $dec_j(n-1)$ in a memory storing input data of the processing operation BDD, notably in a database of input data of the processing operation, or of processing implemented by the service provision device.

In particular, the supervision method SPTPD comprises a prediction D_PRD of input data, the predicted input data forming the substitution data: $d_{sub}$=dp. Notably, the provision of input data D_PRV then supplies the predicted data dp as substitution data $d_{sub}$.

In particular, when the input data of the second component are not available $dec_i$?=[N] and when the control method PP reaches the step for triggering Cj_TRG the execution of the second component Cj, the supervision method SPTPD predicts the input data of the second component $dpc_j$ notably as a function of input data of preceding executions $\{dec_j(q)\}q=1 \ldots n-1$ stored in a memory of input data of the processing operation BDD, notably in a database of input data of the processing operation, or of processing implemented by the service provision device.

In particular, the prediction D_PRD is a function of at least one of the data sets from amongst the following of the recorded input data $\{dec_j(\eta)\}_{\eta=1 \ldots n-1}$ and an associated invocation counter q. The invocation counter q indicates the number of invocations of the processing operation during the recording of the input data. The invocation of the processing operation is understood to mean the request for execution of the processing operation.

In particular, the supervision method SPTPD comprises, if the supervision method SPTPD receives data $dec_i$ from a first component Ci intended for a second component Cj after the execution of the step for triggering Cj_TRG execution of the second component, a provision DE_PPRV of the data $dec_i$ coming from the first component Ci to the second component Cj if a prediction error is detected Err_DTCT=[Y] depending on the predicted input data $d_p$ and on the received input data $dec_j$.

FIG. 1*c* illustrates a simplified diagram of a second part of a method for supervising the control of a distributed parallel processing operation SPTPD according to the invention.

The execution of a processing operation comprises the execution of the control method PP. The launch of the execution of the control method consists of a launch of the execution of the processing operation TT_STR. Then, the control method comprises a succession of steps for triggering components of the processing operation C1_TRG, . . . , Ci_TRG, . . . , Cj_TRG . . . up to the closure of the processing operation TT_CL.

In particular, the supervision method SPTPD comprises, during the closure of the processing operation TT_CL, a recording DE_MEM of the input data $\{dec\}_{i=1 \ldots 1}$ of the components C1, . . . , Ci, . . . , Cj . . . of the processing operation TT being executed.

In particular, the supervision method SPTPD iterates n=n+1, during the closure of the processing operation TT_CL, an invocation counter n reset to zero. Resetting the invocation counter to zero is understood to mean that the invocation counter is at zero prior to the first invocation of the processing operation.

In particular, the supervision method SPTPD comprises an association ASS of the invocation counter n with the recorded data $\{dec_i\}_i$ ($\{dec_i\}_i$, n). In this case, the recording of the data DE_MEM comprises a recording of the pair ($\{dec_i\}_i$, n) composed of the recorded data {dec} and the invocation counter n supplied by the association ASS.

In one particular embodiment of the invention, the supervision method is implemented in the form of a program comprising program code instructions for the execution of the steps of the method for supervising the control of a processing operation when said program is executed by a processor.

FIG. 1*d* illustrates a simplified diagram of a distributed parallel processing operation.

The distributed parallel processing operation TT comprises a control method PP implemented by a service provision device and several components of the processing operation C1 . . . Ci . . . Ci implemented by remote nodes. Potentially, certain nodes may implement one C1, Ci, Cj or several of the components of the processing operation $\{Cj\}_{j \in [1,1]}$.

In particular, the control method PP triggers 1*a*.cmd(exe, $de_{c1}$), . . . , 2*a*.cmd(exe,$de_{ci}$), . . . , 3*a*.cmd(exe,$de_{ci}$) the execution of a component C1, . . . , Ci, . . . , $C_l$.

In particular, the control method PP receives data supplied 1*b*.answ($de_{ci}$), . . . , 2*b*.answ($de_{cj}$), . . . , 3*b*.answ by executed processing components C1 . . . $C_l$. Potentially, the data supplied by a first processing component Ci comprise input data for a second processing component $dec_j$.

Notably, the control method PP triggers the execution of a second component while transmitting the input data {dec} supplied by a first component. This is why, in the prior art, the control method PP waits for the provision of these input data {dec} by the first component before triggering the execution of the execution of the second component.

FIG. 2 illustrates a simplified diagram of a flow diagram illustrating the supervision method according to the invention.

The supervision method SPTPD comprises a launch of the supervision SPTPD. The supervision method receives a call to the processing operation TT_RQ_RCV notably from a communications terminal or, more particularly, to a component of the processing operation Cj_REQ_RCV from the control method PP of the processing operation TT when the control method PP reaches the step for triggering the execution of the component Ci of the processing operation. For example, the communications terminal sends to the service provision device implementing the processing operation TT a processing request or invocation of the processing operation tt_req.

In particular, the supervision method SPTPD verifies sc ? whether the execution of the processing operation has to be implemented in a synchronous or asynchronous manner. For example, the supervision method SPTPD asks the terminal whether the processing operation has to be executed in a synchronous manner or otherwise.

In the affirmative [Y], the supervision method triggers the synchronous execution:

- either of the processing operation SC_TT_REQ, namely that the control method PP triggers the execution of the second components Cj_TRG of the processing operation after receiving the input data $dec_i$ supplied by one or more first components Ci of the processing operation.
- or of the component SC_Cj_REQ, namely the control method PP triggers the execution of the second component Cj_TRG of the processing operation after receipt of the input data dec supplied by one or more first components Ci of the processing operation previously executed.

It should be noted that the verification whether the execution has to be carried out in a synchronous manner or otherwise sc ? may be carried out for each component of the processing operation notably according to the availability of the input data of the second component of the current invocation $dec_j(n)$ when the control method PP reaches the step for triggering the execution of the second component Cj.

In the negative, the supervision method SPTPD carries out an asynchronous call, in other words an invocation without supplying the input data AS_TT, AS_Ci when the execution of a component is triggered. For example, the supervision method SPTPD sends a command exe_cmd to the control method for the triggering of the execution of a component Ci_TRG without supplying the input data for this component.

In particular, the supervision method SPTPD verifies whether the input data must be sent in an asynchronous manner or otherwise d_as ?.

In the affirmative, the supervision method SPTPD implements a data service or data provision D_PRV which obtains data from a previous invocation in a memory or database BDD.

In the negative, the supervision method SPTPD comprises a review of availability of data for the execution of the component DE_RVW. Notably, the supervision method SPTPD verifies the available data d ?.

If data are available d ?=[Y], then the supervision method SPTPD carries out a delayed or anticipated asynchronous processing operation AS_TT, AS_Cj notably as a function of the substitution data $d_{sub}$ generated by the data service D_PRV from the input data of the invocation or from the previous invocations (in other words from a historical record of input data) stored in a memory BDD and/or from predicted data $d_p$.

Otherwise d ?=[N], the supervision method SPTPD predicts D_PRED the input data for the asynchronous processing operation AS_TT, AS_Cj.

Thus, the supervision method SPTPD supplies substitution data comprising either input data from preceding invocation(s) or predicted data indirectly to the component Cj whose execution is triggered in an asynchronous manner.

Irrespective of the type of call/invocation, synchronous or asynchronous, the supervision method SPTPD receives a return TT_RSP, Ci_RSP. When the processing operation invoked is finished, the supervision method is closed STP.

Thus, the invention breaks with the practice of ensuring that the input data for the processing component are available prior to triggering the execution of this component which is often the source of significant coordination delays.

For this purpose, the supervision method SPTPD authorizes execution of the component even if the data are not available. This is possible because the control of the triggering of the execution of the component is transferred from the control method to the supervision method.

Thus, the supervision method offers 3 execution options:

a supply of data D_MNGT without transfer of control, in other words a management of the input data of a component independent of the execution of this component, comprising a recording of the data for future invocations and a supply of the recorded data during a current invocation as substitution data in order for the control method to immediately execute the step for triggering execution of the component of the processing operation with the supply of the substitution data to the component of the processing operation or for predicting D_PRED data $d_p$ used for the asynchronous processing operation AS_TT, AS_Cj;

an invocation of control without input data, in other words the supervision method forces the execution of the step of the control method for triggering execution of a component of the processing operation even if no input data by substituting the input data with substitution data obtained by data prediction D_PRED or simply reading the input data stored in memory from previous invocation(s);

but also a conventional invocation.

The first two options allow the supervision method to de-synchronize the two sub-actions (transfer of control and supply of data) which were heretofore indissociable.

The three execution options combined allow distributed services or processing operations to be implemented that are free of delays waiting for input data.

The first option introduces a memory for the input data to be used for future invocations.

The second option introduces the fact that the unavailable input data are replaced either by input data stored in memory during previous invocations and supplied by the data management D_MNGT or by predicted input data. The prediction D-PRD is notably constructed by learning with a model which will have been designed and trained for each processing operation. In particular, the prediction comprises neural networks and a deep learning method allowing predictors to be designed and trained that are adapted to best predicting the input data for the current invocation or for the following invocation.

FIG. 3 illustrates a simplified diagram of a distributed communications architecture comprising a supervisor according to the invention.

The distributed communications architecture notably comprises a service provision device 1 implementing at least one service or distributed parallel processing operation TT. For this purpose, a controller 10 controls the execution by various nodes $\mathbf{2}_1, \ldots, \mathbf{2}_K$ of the communications network 3 of components C1 . . . Ci of the processing operation TT. In particular, a node 2$k$ comprises a processor $\mathbf{20}_k^i$ designed to execute the component Ci of the processing operation TT.

In a first embodiment illustrated in FIG. 3, the service provision device 1 comprises the controller 10.

In a second embodiment, not shown, the node $\mathbf{2}_O$ (not shown) responsible for the invocation of the processing operation, referred to as invoking node, (in other words having requested the implementation of the processing operation provided by the service provision device) comprises the controller 10. The invoking node 2O comprises a processor 10 designed to execute the control method PP of the processing operation TT.

In a third embodiment, not shown, the invoking node $\mathbf{2}_O$ comprises at least one control interface, not shown, designed to exchange with the controller 10, and the service provision device 1 comprises the controller 10. The control interface notably comprises a launcher designed to trigger the start of the processing operation by the controller. Potentially, the control interface furthermore comprises a processing selector from amongst the processing operations made available by the service provision device 1.

The supervisor 11 is designed to supervise the control of a distributed parallel processing operation in a communications network. The distributed parallel processing operation is composed of a control method implemented by a controller 10 of a service provision device 1 comprising the supervisor 11 and of several components of the processing operation, including a first component and second component, distributed over nodes of the communications network $\mathbf{2}_1, \ldots, \mathbf{2}_k \ldots, \mathbf{2}_K$. The control method comprises a succession of steps including a step for triggering execution of a processing component by a node.

In particular, the controller 10 triggers % a.cmd(exe, $\mathrm{dec}_i)_{i=1 \ldots i}$ the execution by a node $\mathbf{2}_1 \ldots \mathbf{2}_K$ of one component of the processing operation. A node $\mathbf{2}_1 \ldots \mathbf{2}_k \ldots \mathbf{2}_K$ notably comprises an execution command receiver 1$a$.cmd(exe,$\mathrm{dec}_1$), . . . 2$a$.cmd(exe,$\mathrm{dec}_i$), . . . 3$a$.cmd(exe, $\mathrm{dec}_i$), and a processor $\mathbf{20}_k^i$ designed to execute the component Ci of the processing operation (also called first component) upon receipt of the execution command and to supply a processing component result 1$b$.answ($\mathrm{dec}_i$), . . . 2$b$, answ($\mathrm{dec}_i$), . . . 3$b$.answ potentially comprising input data for another component of the processing operation (also called second component).

In particular, the controller 10 is designed to receive the input data for a second component of the processing operation Cj resulting from the execution of a first component of the processing operation Ci % b, answ$(\mathrm{deCj})_{j \in [1,J]}$.

The supervisor 11 comprises a decoupler 110 designed to command 24.$exe$_cmd the execution of the step for triggering execution of a component of the processing operation as soon as the control method has reached the step for triggering the execution of this component 20.$nxt$(Ci).

In particular, the supervisor 11 comprises a memory 113 designed to store data, during the closure of the processing operation, input data of the components of the processing operation being executed.

In particular, the supervisor 11 comprises an invocation counter 116 reset to zero and designed to be iterated during the closure of the processing operation.

In particular, the supervisor 11 comprises a recorder 115 designed to write into a memory 113 input data of the current invocation and/or the number of the current invocation notably supplied by the invocation counter 116. The recorder 115 could also be capable of associating the input data with the number of the invocation in progress prior to recording it notably in the form of a pair: (input data, invocation number).

In particular, the supervisor comprises a reader 115 designed to read during an invocation in progress the data recorded during previous invocation(s), notably in a memory 113. Potentially, the recorder and the data reader could be one and the same data read/write device 115.

In particular, the supervisor 11 comprises a detector 114 for end of processing or for processing operation closure. The end of processing detector 114 triggers 11.*w*_trg(de) the writing by the recorder 115 of the data 12.*de* and/or of the value of the invocation counter 12.(*de,n*). Notably, the invocation counter 126 supplies its value 11'.*n* to the recorder 115 potentially upon request from the recorder 115. In the case of the writing of the value of the invocation counter, the detector 114 or the recorder 115 triggers 13.*it*_trg the iteration of the invocation counter 116 after the recording of the data by the recorder 115.

In particular, the detector 114 is designed to receive end of processing information 10.*cl*(de) from the controller and/or to request, potentially periodically, from the controller 10, the step of the processing operation being executed (for example start, number of component, end, etc.) and/or to detect when the controller 10 reaches the end of processing step.

In particular, the supervisor 11 comprises a receiver 114 designed to receive data from the controller 10, notably the input data of the components of the processing operation being invoked. Potentially, the receiver 114 further comprises the detector for end of processing or closure of processing operation. Thus, the receiver 114 supplies the input data to the recorder 115 with the write triggering w_trg.

In particular, the supervisor comprises a detector of availability of data 111 designed to verify whether the input data are available and if not to trigger 21'.*d*_as the decoupler 110. Thus, in the case where the input data are not available, the decoupler 110 commands 24.*exe*_cmd the execution of the component of the processing operation without the input data. Potentially, the availability detector 111 is triggered 20.*nxt*(Ci) when a step is reached for triggering execution of a component of the processing operation by the controller 10.

In particular, the decoupler 110 supplies substitution data 24.*exe*_cmd($d_{sub}$) instead of the unavailable input data.

In particular, the supervisor 11 comprises a generator of substitution data 112 designed to generate substitution data $d_{sub}$ notably based on the input data recorded in the memory 113, in other words input data of the preceding invocation 22.{de(n−1)}, or on the pairs: input data of the preceding invocation and invocation number 22.$\{de(q)\}_{\eta=n-1}$ and to supply them 23.$d_{sub}$=dec(n−1), 23.$d_{sub}$=$d_p$ to the decoupler 110.

In particular, the supervisor 11 comprises a data reader 1120 designed to read data 22.{de(n−1)}, 22.$\{de(q)\}_{\eta=n-1}$ in the memory 113 and to supply them 23'.*dec*(*n*−1) to the decoupler 110. In one particular embodiment, the generator of substitution data 112 comprises the data reader 1120.

In particular, the supervisor 11 comprises a data predictor 1121 designed to predict the input data of the invocation in progress 23".$d_p$ notably as a function of the input data of the preceding invocations and to supply them 23.$d_{sub}$=$d_p$ to the decoupler 110. In particular, the predictor 1121 receives from the reader 1120 the input data of the previous invocations 23'.$\{de(q)\}_q$=n−1.

In one particular embodiment, the service provision device 1 comprises a controller 10 designed to control a distributed parallel processing operation in a communications network. The distributed parallel processing operation being composed of a control method implemented by the controller 10 and of several components of the processing operation, including a first component and second component, distributed over nodes of the communications network $\mathbf{2}_1$, . . . , 2*k*, . . . , $\mathbf{2}_K$. The control method comprises a succession of steps including a step for triggering execution of a component of the processing operation by a node $\mathbf{2}_k$. The service provision device 1 comprises a supervisor 11 designed to command the execution of the step for triggering execution of a component of the processing operation as soon as the control method has reached the step for triggering the execution of this component.

Potentially, on each node $\mathbf{2}_k$ involved in the distributed parallel processing operation, there will be one instance of the service provision device 1 being executed, responsible for controlling and supervising the remote invocations intended for this node. This will therefore typically be the same service replicated on each of the nodes, with a control part on the invoking node $\mathbf{2}_O$ for the interactions with the original Ci. A node 2*k* implementing a component Ci may also itself be the invoking node for another processing operation. Thus, a node 2*k* of the communications network within which distributed parallel processing operations are executed comprises at least one component of a first processing operation, or several components of one or more first processing operations, and potentially a service provision device providing a second processing operation.

FIG. 4 illustrates a simplified diagram of a communications architecture in which a component of a processing operation is implemented in a remote node of a service provision device controlling the processing operation according to the invention.

A service provision device 1 controls the execution of component(s) of a processing operation of the nodes 2*k* of the communications network 3. In particular, a processor $\mathbf{20}_k^i$ of the node 2*k* executes the component of the processing operation.

The service provision device 1 according to the invention comprises a decoupler 110 designed to allow triggering of the immediate execution of a component of the processing operation as soon as the service provision device 1 has reached the step for triggering the execution of this component.

Thus, the service provision device 1 invokes the processing component asynchronously, in other words before the input data of this component are available.

In particular, the service provision device comprises a data manager 118 designed to record input data notably in a memory 115 (see FIG. 3). Notably, the data manager 118 comprises a generator of substitution data 112 (see FIG. 3) as a function of input data of previous invocation(s). Thus, the data manager 118 allows the input data of a component to be managed asynchronously with respect to the execution of this component.

In particular, the service provision device 1 comprises a standard processing component invoker, in other words synchronous since it commands the execution of a second component while providing the input data supplied by the execution of a first component.

FIG. 5 illustrates a simplified diagram of a communications architecture comprising a service provision device supervising separately the control of the execution by remote nodes of a component of a processing operation and the ad hoc prediction of the input data for the components.

The nodes {2*k*}k=1 . . . K execute one or more of the components of the processing operation C1 . . . Ci.

The execution of these components is controlled by a controller 10 (see FIG. 3) of a service provision device 1.

In particular, a supervisor 11 is designed to trigger, in a delayed (in other words using the input data recorded during the previous invocation q-1) or anticipated (in other words using the prediction) manner, an invocation by the controller 10 of the components of the processing operation.

In particular, the supervisor 11 disposes of a memory 113 in which a history of the input data during one or more of the previous invocations is conserved: either it comprises the memory 113, or it comprises an interface with this memory 113 (notably a recorder and/or memory reader).

In particular, the supervisor 11 comprises an invocation counter 116.

In the example in FIG. 5, the component C1 of the processing operation is triggered in a delayed manner C1_*trg*(t1,η−1), in other words the supervisor triggers an asynchronous invocation using the historical data 113 by the controller of the component C1. This means that the supervisor obtains the input data $dec_1(\eta-1)$ supplied by another component during the previous invocation q-1 for triggering the execution of this component C1 as soon as it has reached the step for triggering the execution of the component C1 at the time t1.

The component C2 is triggered in an anticipated manner C2_*trg*(t2), in other words the supervisor triggers an asynchronous invocation using the predictor by the controller of the component C2. This means that as soon as it has reached the step for triggering the execution of the component C2 at the time t2, the component C2 is triggered notably supplying anticipated data instead of the input data, for example predicted by means of a neural network as a function of the historical data recorded in the memory 113. The implementation of the component is said to be delayed because it uses input data from the previous invocation rather than the current invocation.

The component $C_{p-1}$ of the processing operation is triggered in a delayed manner $C_{p-1}$_trg($t_{p-1}$, η−1), in other words the supervisor triggers an asynchronous invocation using the historical data 113 by the controller of the component $C_{p-1}$. This means that the supervisor obtains the input data $dec_{p-1}(\eta-1)$ supplied by another component during a previous invocation q−1 for triggering the execution of this component $C_{p-1}$ as soon as it has reached the step for triggering the execution of the component $C_{p-1}$ at the time $t_{p-1}$.

The component Cp is triggered in an anticipated manner Cp_trg(tp), in other words the supervisor triggers an asynchronous invocation using the predictor by the controller of the component Cp. This means that as soon as it has reached, at the time tp, the step for triggering the execution of the component Cp notably supplying anticipated data instead of the input data, notably predicted by means of a neural network as a function of the historical data recorded in the memory 113.

Thus, the supervisor provides an asynchronous invocation and predictive service.

For this asynchronous invocation and predictive service, the recording of a processing operation notably consists in creating an invocation counter for this processing operation, which will be reset to 0. In particular, the asynchronous invocation and predictive service also allocates memory space for conserving the values of the latest parameters received. Following each new call or invocation of a processing operation, the value of the invocation counter for this processing operation is incremented, and the values of the latest parameters are updated.

Thus, the first purpose of an asynchronous invocation and predictive service is to store in memory the values of the parameters from the previous calls. All the latest calls of each processing operation are recorded in order to be able to use them at the next call if there is no new value available. At each invocation of a processing operation, the values which are not present at the inputs are obtained from this storage space for the previous parameter values.

In particular, a second objective of an asynchronous invocation and predictive service is the association of a predictor of parameters with each processing operation recorded, a component of the asynchronous invocation and predictive service performing the function of prediction of the values of the parameters at the invocation no i+1, using the values of these parameters at the invocation no i (i=1, 2, . . . ). Notably, the predictor is designed and trained by learning based on historical invocation data.

In one software implementation, a software application for each remote processing operation is thus associated with a kind of cooperative software working in concert with this processing operation in order to reduce the coordination delays.

Potentially, it could happen that the prediction is not of sufficient quality to guarantee a correct execution. For this purpose, following a processing operation using predicted values, the supervisor comprises in particular a comparator of the predicted values with the received values. If the difference in values conforms to a specified threshold of validity, it is then validated, otherwise it is invalid and the processing operation is restarted with the new values received. This mechanism allows the erroneous predictions inherent in the learning process to be handled, and thus the robustness of the invention to be reinforced.

The invention is also aimed at a medium. The information medium may be any given entity or device capable of storing the program. For example, the medium may comprise a storage means such as a ROM, for example a CD ROM or a microelectronic circuit ROM or else a magnetic means of recording, for example a diskette or a hard disk.

On the other hand, the information medium may be a transmissible medium such as an electrical or optical signal which may be carried via an electrical or optical cable, by radio or by other means. The program according to the invention may in particular be up/downloaded over a network notably of the Internet type.

The software implementation of this invention relies on machines known as complete machines, which are machines with all the resources needed for the execution of a program. A (complete) machine may be:

A basic machine: The equivalent of a PC or a physical server with a single non-specific processing unit, of the CPU/GPU type. The machine with several non-specific processing units can support the executions of up to as many basic machines as there are non-specific processing units.

Either a virtual machine (VM) for a basic machine, such as implemented in the modern virtualization software applications (of the hypervisor type) and cloud service infrastructures.

Or a container for a basic machine, such as implemented in the platforms and container orchestrators (Docker, Kubernetes, Mesos, etc.) and used for the programming of distributed cloud-native services, based on micro-services containers and architectures.

For the software implementation, the asynchronous invocation and predictive service is designed and implemented in such a manner as to be able to execute one or more instance(s) of this asynchronous invocation and predictive service on each basic machine of the infrastructure. The basic machines of the peripheral installations under the control of the operator, generally aggregated within small datacenters, will each execute at least one instance of the asynchronous invocation and predictive service. The assembly of these basic machines equipped with asynchronous invocation and predictive services, organized into small datacenters, will be used as a distributed cloud infrastructure for programming, deploying and executing higher performance services by reducing the coordination delays.

The invention may be integrated into the cloud infrastructure services of an operator: distributed Multiservice Edge Computing (MEC) services, NWDAF (Network Data Analytics Function) service for the analysis of data and AI in 5G networks, distributed learning platforms (TensorFlow, Keras, etc.), platforms for real-time massive data processing and for online learning (Hadoop (MapReduce), Spark, Flink, etc.), etc.

Alternatively, the information medium may be an integrated circuit in which the program is incorporated, the circuit being designed to execute or to be used in the execution of the method in question.

In another implementation, the invention is implemented by means of software and/or hardware components. In this regard, the term module may just as easily correspond to a software component or to a hardware component. A software component corresponds to one or more computer programs, one or more sub-programs of a program or, more generally, to any element of a program or of a software application designed to implement a function or a set of functions according to the description hereinabove. A hardware component corresponds to any element of a hardware assembly designed to implement a function or a set of functions.

The incorporation of the invention into the infrastructure services endows them with an enhanced capability to reduce the coordination delays, which allows the performance characteristics to be improved. This may give rise to valorizations by equipment suppliers, operators, 5G (+) service providers, computer manufacturers, etc.

The invention may be used by software in applications of many fields, amongst which:

Fabrications of network slices, notably the control of the peripheral part.

Virtualization of network functions (NFV), distributed virtual network services.

5G (+) applications:

New applications requiring reliable communications and with a low latency, in the fields of autonomous vehicles, 4.0 industries, augmented realities, telemedicine, etc. These applications may benefit from the improvements in performance of the invention, in order to reduce the latencies and to improve the end-to-end reliability. The invention provides a complement of the edge computing concept for improving the reliability and for a greater reduction in the latency.

The performance characteristics of certain massive IoT applications may also be improved by virtue of this invention, notably in the field of intelligent towns and territories.

Very high rate multimedia applications, together with those of connected dwellings and of virtual realities with 3D video, may also see their performance characteristics improved by virtue of this invention, which also allows the consumption of network data rates to be optimized.

The instrumentation of a 5G(+) network by a distributed NWDAF service: prediction of the mobility, analysis and prediction of the loading of the functions and network slices, network observations and client experience, etc.

Improvement in the performance of the conventional distributed systems and applications by virtue of the networks of operators, which may open new markets for the operators.

The invention targets the services and applications of the 5G (+) networks field, with a high granularity and having a low ratio of remote calls. It could then be generalized to high-performance real-time applications provided outside of the networks of operators. This extension will allow markets to be targeted that are historically occupied by IT actors:

Online services: data streams and online learning: marketing, social networks analyses, etc.

Applications with high-performance data analysis and distributed learning.

Distributed AI, collaborative learning and applications.

The invention claimed is:

1. A supervision method implemented by a control supervision device and comprising:

supervising control of a distributed parallel processing operation in a communications network, the distributed parallel processing operation being composed of a control method implemented by a service provision device and of several components of the processing operation, including a first component and second component, distributed over nodes of the communications network, the control method comprising a succession of steps including a step of triggering execution of a component of the processing operation by a node, the supervising comprising:

executing the step of triggering execution of the component of the processing operation as soon as the control method has reached the step of triggering the execution of this component;

predicting input data, the predicted input data constituting substitution data;

wherein, if, when the control method reaches a step of triggering execution of a second component of the processing operation, input data supplied by a first component of the processing operation and necessary for launch of the execution of the second component of the processing operation are not available, the control supervision device provisions the substitution data to the control method;

during closure of the processing operation, recording the input data of the components of the processing operation being executed;

iterating, during closure of the processing operation, an invocation counter reset to zero;

associating the invocation counter with the recorded input data; and wherein the predicting is a function of at least one data set from amongst the recorded input data and the associated invocation counter.

2. The supervision method as claimed in claim 1, wherein the supervision method comprises reading the input data of a preceding execution of the second component, the input data of the preceding execution constituting the substitution data.

3. The supervision method as claimed in any claim 1, wherein the supervision method comprises, if the supervision method receives data from a first component intended for a second component after the execution of the step of triggering execution of the second component, a supply of the data coming from the first component to the second component if a prediction error is detected depending on the predicted input data and on the received input data.

4. A non-transitory computer readable medium comprising a program stored thereon comprising program code instructions for execution a method for supervising control of a processing operation when said program is executed by a processor of a control supervision device, the supervision method comprising:

supervising control of a distributed parallel processing operation in a communications network, the distributed parallel processing operation being composed of a control method implemented by a service provision device and of several components of the processing operation, including a first component and second component, distributed over nodes of the communications network, the control method comprising a succession of steps including a step of triggering execution of a component of the processing operation by a node, the supervising comprising:

executing the step of triggering execution of the component of the processing operation as soon as the control method has reached the step of triggering the execution of this component;

predicting input data, the predicted input data constituting substitution data;

wherein, if, when the control method reaches a step of triggering execution of a second component of the processing operation, input data supplied by a first component of the processing operation and necessary for launch of the execution of the second component of the processing operation are not available, the control supervision device provisions the substitution data to the control method;

during closure of the processing operation, recording the input data of the components of the processing operation being executed;

iterating, during closure of the processing operation, an invocation counter reset to zero;

associating the invocation counter with the recorded input data; and wherein the predicting is a function of at least one data set from amongst the recorded input data and the associated invocation counter.

5. A control supervision device comprising:

at least one processor;

at least one non-transitory computer readable medium comprising instructions stored thereon which when executed by the at least one processor configure the control supervision device to execute a supervision method comprising supervising control of a distributed parallel processing operation in a communications network, the distributed parallel processing operation being composed of a control method implemented by a controller of a service provision device comprising the supervisor and of several components of the processing operation, including a first component and second component, distributed over nodes of the communications network, the control method comprising a succession of steps including a step of triggering execution of a component of the processing operation by a node, the supervision method comprising:

commanding the execution of the step of triggering execution of the component of the processing operation as soon as the control method has reached the step of triggering the execution of this component;

predicting input data, the predicted input data constituting substitution data;

wherein, if, when the control method reaches a step of triggering execution of a second component of the processing operation, input data supplied by a first component of the processing operation and necessary for launch of the execution of the second component of the processing operation are not available, the control supervision device provisions the substitution data to the control method;

during closure of the processing operation, recording the input data of the components of the processing operation being executed;

iterating, during closure of the processing operation, an invocation counter reset to zero;

associating the invocation counter with the recorded input data; and wherein the predicting is a function of at least one data set from amongst the recorded input data and the associated invocation counter.

6. The control supervision device as claimed in claim 5, wherein the control supervision device comprises a memory configured to store, during closure of the processing operation, the input data of the components of the processing operation being executed.

7. A service provision device comprising:

a controller comprising at least one processor configured to control a distributed parallel processing operation in a communications network, the distributed parallel processing operation being composed of a control method implemented by the controller and of several components of the processing operation, including a first component and second component, distributed over nodes of the communications network, the control method comprising a succession of steps including a step of triggering execution of a component of the processing operation by a node; and a control supervision device comprising at least one processor configured to:

command the execution of the step for triggering execution of a component of the processing operation as soon as the control method has reached the step of triggering the execution of this component;

predict input data, the predicted input data constituting substitution data;

wherein, if, when the control method reaches a step of triggering execution of a second component of the processing operation, input data supplied by a first component of the processing operation and necessary for launch of the execution of the second component of the processing operation are not available, provision the substitution data to the control method;

during closure of the processing operation, record the input data of the components of the processing operation being executed;

iterate, during closure of the processing operation, an invocation counter reset to zero;

associate the invocation counter with the recorded input data; and wherein the predicting is a function of at least one data set from amongst the recorded input data and the associated invocation counter.

* * * * *